United States Patent Office 2,931,837
Patented Apr. 5, 1960

2,931,837
LONG CHAIN ALKOXY-DIOLS

Harry A. Stansbury, Jr., South Charleston, and Howard R. Guest, Charleston, W. Va., assignors to Union Carbide Corporation, a corporation of New York No Drawing. Application April 13, 1956
Serial No. 577,942

6 Claims. (Cl. 260—615)

This invention pertains to a new series of long chain alkoxy-substituted diols, in which the hydroxy groups are in the terminal positions, and to a method for making them. In this series of compounds, the terminal hydroxyl groups are separated by an odd number of carbon atoms, which is at least seven, and the number of alkoxy substituents is related to the chain length of the diols by the relationship $$N = 1 + \frac{n-7}{2}$$

where N is the number of alkoxy substituents, and $n$ is the odd number of carbon atoms in the chain.

Long chain diols in which the terminal hydroxyl groups are separated by an odd number of carbon atoms have heretofore been unavailable by methods adopted to industrial synthesis. For example, 1,7-heptanediol has been made heretofore by the reduction of diethyl pimelate with metallic sodium by the Bouvealt and Blanc method. It has also been isolated in small yields by the hydrogenation of B-furylacrolein. The present invention not only includes a commercially attractive method for making long chain primary diols, but it also provides a novel series of alkoxy-substituted diols. Such alkoxy-substituted diols are of particular value in making polyesters, wherein the alkoxy substituents contribute lower freezing points and increased compatibility with synthetic resins.

The basic raw materials utilized in the new synthesis of long chain alkoxy-substituted diols are acrolein and vinyl alkyl ethers, both of which are available commercially at reasonable costs. In the first step, acrolein is condensed in a known manner with a vinyl alkyl ether to yield a 2-alkoxy-3,4-dihydro-2H-pyran. This pyran is reacted with an alkanol in such a manner as to open the pyran ring and form 1,1,5,5-tetraalkoxypentanes or glutaraldehyde diacetals. These diacetals are then reacted with at least one mole of a vinyl alkyl ether to form diacetals of alkoxy-substituted alpha, omega dialdehydes having at least one alkoxy substituent in the chain and at least seven carbon atoms in the chain. The chain length of these dialdehyde diacetals increases in increments of two carbon atoms, depending on the number of moles of vinyl alkyl ether reacted, and they contain an added alkoxy group for each increment of two carbon atoms in the chain. These alkoxy-substituted dialdehyde diacetals are then hydrolyzed to the corresponding dialdehydes, which are then hydrogenated to form the long chain alkoxy-substituted diols of this invention.

The various steps of the synthesis are illustrated below:

(I)

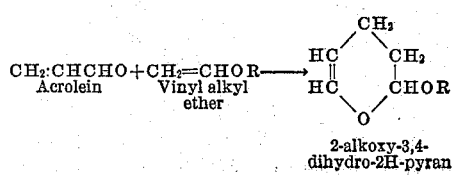

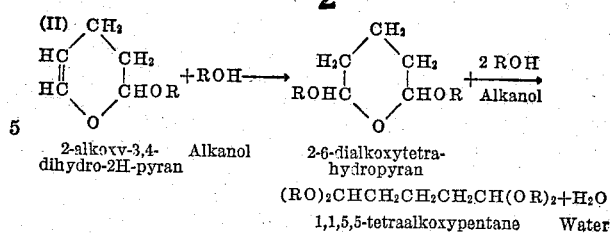

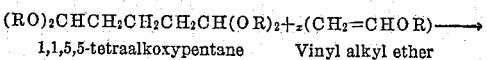

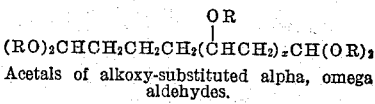

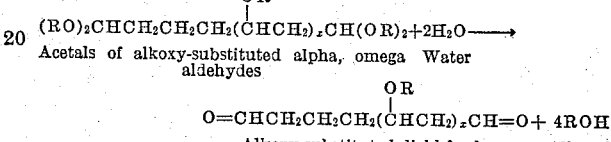

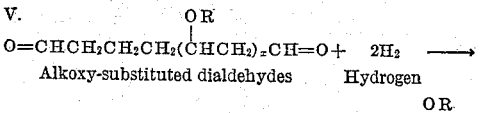

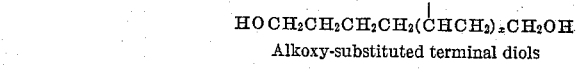

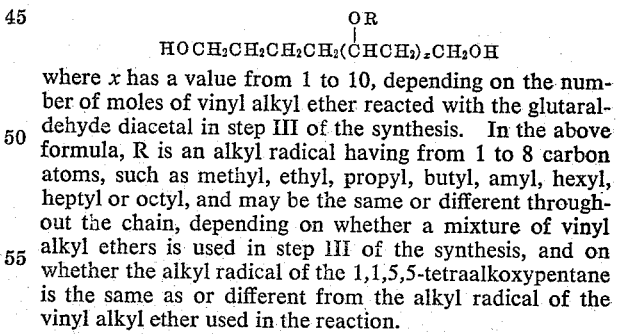

It will be noted that over-all synthesis involves the addition of vinyl alkyl ethers, stepwise, first to a three carbon atom compound, acrolein, and then to the resulting five carbon atom compound, the glutaraldehyde acetals. Furthermore, the process is regenerative, in that the alcohol used in step II is recovered in the hydrolysis step IV. As all the steps may be carried out with good efficiencies, the overall process is an effective one for converting acrolein and vinyl alkyl ethers to long chain terminal diols.

The alkoxy-substituted terminal diols of this invention are represented by the formula:

$$\text{HOCH}_2\text{CH}_2\text{CH}_2\text{CH}_2(\overset{\text{OR}}{\underset{|}{\text{CHCH}_2}})_x\text{CH}_2\text{OH}$$

where $x$ has a value from 1 to 10, depending on the number of moles of vinyl alkyl ether reacted with the glutaraldehyde diacetal in step III of the synthesis. In the above formula, R is an alkyl radical having from 1 to 8 carbon atoms, such as methyl, ethyl, propyl, butyl, amyl, hexyl, heptyl or octyl, and may be the same or different throughout the chain, depending on whether a mixture of vinyl alkyl ethers is used in step III of the synthesis, and on whether the alkyl radical of the 1,1,5,5-tetraalkoxypentane is the same as or different from the alkyl radical of the vinyl alkyl ether used in the reaction.

While it is possible to isolate definite compounds from the diol mixtures of this invention, such as 3-ethoxy-1,7-heptanediol, the more valuable compositions will comprise mixtures of such diols where $x$ has a value from 1.5 to 5.5.

In such reactions of the vinyl alkyl ethers with the 1,1,5,5-tetraalkoxypentanes, it is desirable to use an acidic catalyst. Suitable catalysts include boron trifluoride and acid treated clays. The reaction temperatures may be from about −10° C. to about 100° C. with 30° C. to 60° C. being the preferred range. The corresponding reaction pressures may vary from about 5 to 150 p.s.i.a., with pressures of 15 p.s.i.a. to 50 p.s.i.a. being preferred.

The hydrolysis of the alkoxy-substituted acetals to the alkoxy-substituted dialdehydes, shown in step IV of the synthesis, is best accomplished at a pH of 1 to 5, with a pH of 2 to 3, being preferred. The hydrolysis temperatures are in the range of 20° C. to 150° C. with temperatures of 80° C. to 100° C. being preferred. Depending on the temperature, the reaction time may vary from a few minutes to as long as 20 hours. The amount of water used for the hydrolysis may be varied from about 10% of the weight of the acetals to about 500%, with about 100% being preferred.

The hydrogenation of the alkoxy-sustituted dialdehydes to the alkoxydiols preceeds best at a pH of 3 to 7, with a pH of 5 to 6 being preferred. The hydrogenation temperature may be from 20° C. to 180° C., at pressures from 15 p.s.i.a. to 200 p.s.i.a. A hydrogenation catalyst, such as Raney nickel or cobalt, is usually employed.

The alkoxy-substituted terminal diols of this invention are extremely valuable intermediates because the alkoxy-substituted carbon chains between the terminal hydroxyl groups can be varied from a minimum of seven carbon atoms to as long as twenty-five carbon atoms. Thus, a proper balance can be maintained in the final derivative

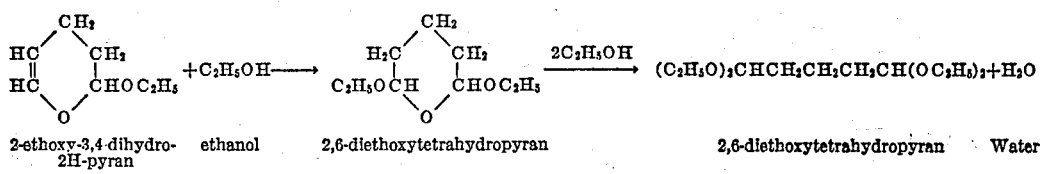

2-ethoxy-3,4-dihydro- ethanol  2,6-diethoxytetrahydropyran  
2H-pyran 2,6-diethoxytetrahydropyran   Water between the properties contributed by the alkoxy-substituted carbon chain and the functional group employed to combine with the terminal hydroxyl groups. Thus, the diols may form a series of polyesters with dibasic acids, such as succinic, glutaric, adipic, sebacic and azelaic acids, of the formula:

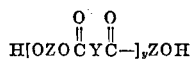

where $y$ is an integer having a value from 1 to 10, Y is the alkylene radical of the dibasic acid and has from 2 to 10 carbon atoms and Z is the residue of the alkoxy-diols having the formula:

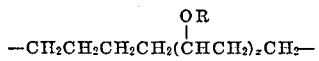

Depending on the value of $x$, it will be seen that the ratio of carbon atoms to carbonyl groups in the polyesters can be varied over a wide range. Thus, considering only the carbon atoms contributed by the Z radical, the ratio of carbon atoms in the diol to carbonyl groups, C/CO, is at least 3.5, and may be as high as 12.5. High carbon to carbonyl ratios in polyesters improve physical and chemical stability in the polyesters. Such polyesters are valuable plasticizers for vinyl chloride polymers and other synthetic resins. By varying the value of $x$, the solubility and compatibility of such polyesters can be controlled.

The polyesters are also of considerable value for forming polyurethane elastomers having low brittle points by the reaction of the terminal hydroxyl groups of the polyesters with diisocyanates. Because of the high C/CO ratio contributed by the long chain diols, such elastomers have improved stability to oxidation and hydrolysis.

Diesters of the alkoxy-substituted terminal diols are readily prepared by acylation of the diols with an alkanoic acid, such as acetic, propionic, butyric, 2-ethylbutyric, hexanoic and 2-ethylhexoic acids. Such diesters are valuable plasticizers for vinyl chloride polymers.

The diols of the formula,

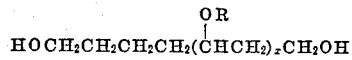

where $x$ has a value below about 2 when R is ethyl, and below about 4 when R is methyl, are water-soluble and they are useful as emollients in cosmetic creams, as coupling agents in water-based emulsions, and as humectants.

The longer chain diols when R is ethyl are water-insoluble and are useful as plasticizers and softening agents for polyvinyl alcohol, polyvinyl alkyl ethers, and polyvinyl acetal resins. The water-soluble diols are insect repellents, and have the advantage of ready removal by washing after use.

The alkoxy-substituted diols of the invention are also of value for reaction with phenols to form phenolic materials substituted by the long alkoxy-containing chain of the diol. These phenolic materials may be reacted with formaldehyde to form phenolic resins having outstanding properties as coatings. Thus, on baking the resin on a surface, a tough and flexible film is formed having good resistance to water and solvents.

The various steps of the synthesis of the diols from acrolein and vinyl alkyl ethers are illustrated in the examples to follow, the first step of the synthesis, the formation of the 2-alkoxy 3,4-dihydro-2H-pyrans, being shown in U.S. Patent No. 2,514,168.

PREPARATION OF 1,1,5,5-TETRAALKOXYPEN-TANE—STEP II

*Example 1*

A mixture of 2760 grams of anhydrous ethanol (60 mols) and 3.68 grams of 96% sulfuric acid (0.075 equivalent) was stirred at 40° C.–55° C. while 768 grams of 2-ethoxy-3,4-dihydro-2H-pyran (6 mols) were fed over a period of 30 minutes. The solution was refluxed for 1 hour to complete the reaction. After 8.2 grams of anhydrous sodium acetate (0.1 equivalent) were added, the mixture was distilled under reduced pressure to obtain 2,6-diethoxytetrahydropyran in 43% yield and 1,1,5,5-tetraethoxypentane in 53% yield based on 2-ethoxy-3,4-dihydro-2H-pyran.

*Example 2*

A mixture of 3.68 grams of 96% sulfuric acid (0.075 equivalent), 1918 grams of anhydrous ethanol (43 mols) and 748 grams of 2,6-diethoxytetrahydropyran (4.3 mols) was refluxed for 2 hours. After 8.2 grams of anhydrous sodium acetate were added to neutralize the catalyst, the mixture was fractionated under reduced pressure to obtain 1,1,5,5-tetraethoxypentane in 52% yield and 98% efficiency based on 2,6-diethoxytetrahydropyran.

CONDENSATION OF 1,1,5,5-TETRAALKOXYPEN-TANE WITH VINYL ALKYL ETHER—STEP III

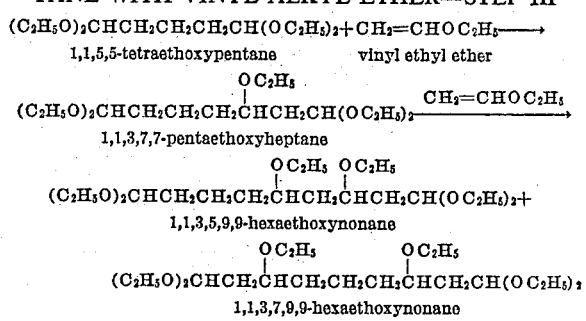

*Example 3*

A mixture of 124 grams of 1,1,5,5-tetraethoxypentane (0.5 mol) and 52 grams of "Superfiltrol" (an acid-treated clay sold by the Filtrol Corporation) was stirred at 25° C.–30° C. while a solution of 144 grams of vinyl ethyl ether (2 mols) in 248 grams of 1,1,5,5-tetraethoxypentane (1 mol) was fed over a period of 40 minutes. After a reaction period of half an hour at 25° C., the mixture was filtered. The filtrate was mixed with 5 grams of potassium carbonate (to neutralize traces of acid) and distilled to obtain the following product fractions:

| Fraction | Boiling Range | Equivalent Weight as Acetal | Sp. G. 20/20° | N 30/D |
|---|---|---|---|---|
| 1 | 121°–132° C./1 mm | 152.2 | 0.930 | 1.4242 |
| 2 | 132°–154° C./1 mm | 177.0 | 0.938 | 1.4273 |
| 3 | 154°–210° C./1 mm | 191.0 | 0.958 | 1.4384 |

Fraction 1 was 1,1,3,7,7-pentaethoxyheptane, for which the theoretical equivalent weight as acetal is 160. Fraction 2 was a mid-cut, while fraction 3 was a mixture of 1,1,3,5,9,9-hexaethoxynonane and the isomeric 1,1,3,7,9,9-hexaethoxynonane, for which the theoretical equivalent weight is 196. The yield of 1,1,3,7,7-pentaethoxyheptane was 13%, while the yield of hexaethoxynonane was 25% based on the vinyl ethyl ether.

*Example 4*

A mixture of 1.6 grams of 47% boron trifluoride in diethyl ether (0.033 equivalent) and 303 grams of 1,1,5,5-tetraethoxypentane (1.22 mols) was stirred at 35°–40° C. while a solution of 432 grams of vinyl ethyl ether (6 mols) in 744 grams of 1,1,5,5-tetraethoxypentane (3 mols) was fed over a period of one hour and forty minutes. After a reaction period of 45 minutes at 35° C., 5.3 grams of powdered anhydrous sodium carbonate (0.1 equivalent) were added and the mixture was stirred for 2 hours at 30° C. The mixture was filtered and the filtrate was flash-distilled (in the presence of 5 grams of sodium carbonate) to a kettle temperature of 248° C. at a reduced pressure of 4 mm. The residue (437 grams) had an equivalent weight of 344 by acetal analysis.

The flash-distilled product fraction (514 grams) was fractionated to isolate the following fractions:

| Fraction | Boiling Range | Equivalent Weight as Acetal | Sp. G. 20/20° | n30/D |
|---|---|---|---|---|
| 1 | 143°–153° C./3 mm | 166.5 | 0.928 | 1.4258 |
| 2 | 153°–163° C./3 mm | 186.0 | 0.933 | 1.4287 |
| 3 | 163°–175° C./3 mm | 201.0 | 0.937 | 1.4308 |
| 4 | 175°–212° C./3 mm | 221.0 | 0.943 | 1.4350 |

Fraction 1 was 1,1,3,7,7-pentaethoxyheptane, fraction 2 was a mid-cut, fraction 3 was a mixture of 1,1,3,5,9,9-hexaethoxynonane and the isomeric 1,1,3,7,9,9-hexaethoxynonane and fraction 4 was mostly the latter isomeric mixture. The yield of 1,1,3,7,7-pentaethoxyheptane was 10% and the yield of hexaethoxynonane was 15% based on 1,1,5,5-tetraethoxypentane.

PREPARATION OF ALKOXY SUBSTITUTED DIALDEHYDES—STEP IV (C₂H₅O)₂OCHCH₂CH₂CH₂CH(OC₂H₅)₂+ₓCH₂=CHOC₂H₅ ⟶

1,1,5,5-tetraethoxypentane       vinyl ethyl ether

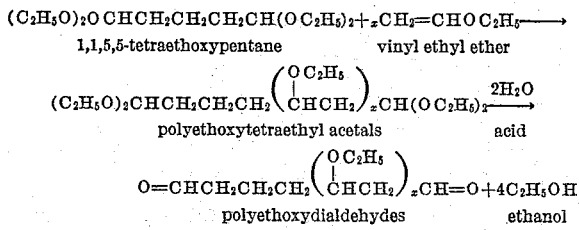

polyethoxytetraethyl acetals      acid $$O=CHCH_2CH_2CH_2\left(\begin{array}{c}OC_2H_5\\|\\CHCH_2\end{array}\right)_xCH=O+4C_2H_5OH$$

polyethoxydialdehydes      ethanol

*Example 5*

A mixture of 992 grams of 1,1,5,5-tetraethoxypentane (4 mols) and 40 grams of "Superfiltrol" (dried at 200° C. for 17 hours) was stirred at 45°–50° C. while a solution of 864 grams of vinyl ethyl ether (12 mols) in 1984 grams of 1,1,5,5-tetraethoxypentane (8 mols) was fed over a period of 2.5 hours. After a reaction period of 2 hours at 50° C., the mixture was cooled and filtered. The filtrate was stripped (in the presence of 35 grams of anhydrous potassium carbonate) to a kettle temperature of 175° C./1 mm. to recover the unreacted 1,1,5,5-tetraethoxypentane. The filtered residue product had these properties: N 30/D 1.4310, sp. g. 20/20° 0.938, 197.5 equivalent weight by acetal analysis. This analysis indicated that the average value of $x$ in the general formula was 2.04 and that the average chain length was about 9 carbon atoms. The yield and efficiency were 40% and 95%, respectively, based on tetraethoxypentane. The yield and efficiency based on vinyl ethyl ether were 82% and 90%, respectively.

The above polyethoxytetraethyl acetal (1724 grams, 8.72 equivalents) was mixed with an equal weight of water and 33 ml. of 0.5 N sulfuric acid were added to reduce the pH to 3. The mixture was distilled with reflux for 5.5 hours until no more ethanol was being generated. Analysis of the aqueous ethanol distillate (967 grams) showed that it was 83% ethanol, which corresponded to a quantitative yield of ethanol based on the acetal charged. The residue was separated into 803 grams of oil layer which contained 4.37 equivalents of aldehyde and 1686 grams of water layer which contained 3.18 equivalents of aldehyde by analysis. The yield of dialdehydes based on the tetraethyl acetals was 86.6%.

*Example 6*

A mixture of 744 grams of 1,1,5,5-tetraethoxypentane (3 mols) and 4.4 grams of 43% boron trifluoride in diethyl ether was stirred at 50° C. while a solution of 1296 grams of vinyl ethyl ether (18 mols) in 1488 grams of 1,1,5,5-tetraethoxypentane (6 mols) was fed over a period of 2.1 hours. The catalyst was neutralized by the addition of gaseous anhydrous ammonia. The mixture was filtered and stripped to a kettle temperature of 175° C. at a reduced pressure of 3 mm. to obtain 2537 grams of polyethoxytetraethyl acetals as a residue product having n 30/D 1.4340, sp. g. 20/20° 0.944, 214 equivalent weight by acetal analysis. The yield and efficiency based on vinyl ether were 82% and 90%, respectively. The yield and efficiency based on 1,1,5,5-tetraethoxypentane were 66% and 90%, respectively.

The polyethoxytetraethyl acetal (2530 grams, 214 equivalent weight, 11.82 equivalents, $x=2.5$ in the general formula) was distilled with 1250 ml. of water containing 25 ml. of 0.5 N sulfuric acid to reduce the pH to 2. After 8 hours, 1313 grams of aqueous ethanol had been distilled and no more ethanol was being formed. The residue was separated into 1653 grams of oil layer which contained 10.8 equivalents of aldehyde and 801 grams of aqueous layer which contained 0.662 equivalent of aldehyde by analysis. The yield of dialdehydes based on the acetals was 97%.

*Example 7*

A mixture of 1948 grams of polyethoxytetraethyl acetals (192 equivalent weight, $x=2.03$, 10.15 equivalents) was distilled with 1948 ml. of water containing 30 ml. of 0.5 N sulfuric acid to reduce the pH to 3. After 6 hours, 1199 grams of distillate containing 20.6 mols of ethanol had been collected and no more ethanol was being liberated. The residue was separated into 914 grams of oil layer containing 6.12 equivalents of aldehyde and 1758 grams of aqueous layer containing 3.30 equivalents of aldehyde by analyses. The yield of dialdehydes was 93% based on the acetals.

PREPARATION OF ALKOXY SUBSTITUTED TERMINAL DIOLS—STEP V

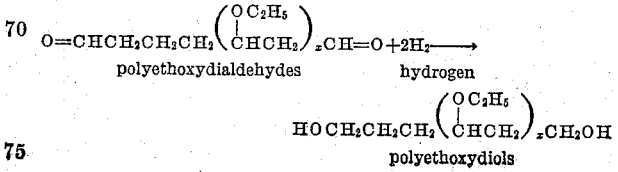

polyethoxydiols

Example 8

The polyethoxytetraethyl acetals were prepared as previously described to obtain a residue product having an equivalent weight of 192.6, with $x=1.91$ in the above formula. This acetal mixture was hydrolyzed as previously described to produce the dialdehydes in 95% yield. The resulting layers (containing 4.11 equivalents of aldehyde) were treated with 20 ml. of 2% sodium hydroxide (to increase the pH to 6) and hydrogenated in the presence of 5% by weight of Raney nickel. The filtered product was fractionated to obtain 3-ethoxy-1,7-heptanediol ($x=1$ in the above formula) having these properties; boiling range 150°–170° C./3 mm., $n$ 30/D 1.4567, sp. g. 20/20° 1.000, 92 equivalent weight by hydroxyl analysis (theory 88), 180 molecular weight by the Menzies-Wright method (theory 176), 60.4% C. (theory 61.3%), 11.3% H (theory 11.3%), miscible with water. The higher boiling fractions had the properties recorded below:

| Fraction | Boiling Range at 3 mm., °C. | Mol. Wt.[1] | Eq. Wt.[2] | $n$ 30/D | Sp.G. 20°/20° | Percent C | Percent H | $x$ [3] | Miscible with Water |
|---|---|---|---|---|---|---|---|---|---|
| 1 | 170–190 | 216 | 115 | 1.4610 | 1.030 | 61.8 | 11.3 | 1.54 | Yes. |
| 2 | 190–249 | 310 | 163 | 1.4614 | 1.000 | 61.9 | 12.9 | 2.86 | No. |

[1] Determined by the Menzies-Wright method.
[2] Determined by analytical phthalation.
[3] Calculated from the observed molecular weight.

All but 5% of the product was distilled. The yield of diols was 80% based on the dialdehyde charged.

Example 9

An aqueous mixture of polyethoxydialdehydes having an equivalent weight of 113 ($x=1.75$) prepared as previously described, was treated with 2% sodium hydroxide to increase the pH to 6. The mixture was hydrogenated in the presence of 5% of Raney nickel to a temperature of 150° C. at 1000 p.s.i.g. The product was filtered and stripped to a kettle temperature of 60° C./7 mm. to obtain a practically colorless residue product having these properties: $n$ 30/D 1.4606, sp. g. 20/20° 1.010, 161.5 equivalent weight by hydroxyl analysis, miscible with 1 volume of water but immiscible with 2 volumes of water. This product (846 grams) was distilled in a rotor type of molecular still to obtain the following fractions:

| Fraction | Rotor Temp., °C. | Press., Microns | Grams Weight | $n$ 30/D | Equivalent Weight [1] | $x$ [2] | Mol. Wt.[3] |
|---|---|---|---|---|---|---|---|
| 1 | 100 | 200 | 16 | 1.4582 | | | |
| 2 | 98 | 13 | 247 | 1.4598 | 104.2 | 1.45 | 185.4 |
| 3 | 125 | 9 | 241 | 1.4592 | 139.0 | 2.42 | 254.7 |
| 4 | 180 | 22 | 200 | 1.4633 | 147.0 | 2.64 | 342.5 |
| 5 | 190 | 23 | 45 | 1.4644 | 214.0 | 4.50 | 478.0 |
| Residue | | | 42 | | 296.0 | 6.78 | 815.0 |
| | | | 791 | | | | |

[1] Determined by analytical phthalation.
[2] The average value of $x$ in the general formula as calculated from the observed equivalent weight.
[3] Determined by the Menzies-Wright method.

This distillation shows that only about 5% of the residue product could not be distilled.

Example 10

A mixture of 744 grams of 1,1,5,5-tetraethoxypentane (3 mols) and 37 grams of "Superfiltrol" (dried at 200° C.) was stirred at 50° C. while a solution of 1296 grams of vinyl ethyl ether (18 mols) in 1488 grams of 1,1,5,5-tetraethoxypentane (6 mols) were fed over a period of 3.2 hours. After a reaction period of 2.5 hours at 50° C., the mixture was filtered and distilled (in the presence of 32 grams of pulverized sodium carbonate) to a kettle temperature of 192° C./2 mm. The filtered residue product had these properties: $n$ 30/D 1.4346, sp. g. 20/20° 0.942, 260 equivalent weight by acetal analysis. The yield and efficiency were 45% and 81%, respectively, based on 1,1,5,5-tetraethoxypentane. The yield and efficiency were 85% and 91%, respectively, based on vinyl ethyl ether.

The above acetal ($x=3.78$ in the general formula) was hydrolyzed as previously described to produce the dialdehydes in 94% yield. The neutralized aqueous mixture of dialdehydes was hydrogenated in the presence of 5% by weight of Raney nickel catalyst. The filtered product was stripped to a kettle temperature of 75° C./12 mm. to obtain a residue product having these properties: $n$ 30/D 1.4581, sp. g. 20/20° 0.998, 181.5 equivalent weight by hydroxyl analysis, 336 molecular weight by the Menzies-Wright method, insoluble in water. The yield of diol was 80% based on the dialdehyde charged.

Example 11

A mixture of 372 grams of 1,1,5,5-tetraethoxypentane (1.5 mols) and 24 grams of "Superfiltrol" (dried at 200° C.) was stirred at 500° C. while a solution of 744 grams of 1,1,5,5-tetraethoxypentane (3 mols) in 1296 grams of vinyl ethyl ether (18 mols) was fed over a period of 2.6 hours. After a reaction period of 3 hours at 50° C., the mixture was filtered. The filtrate was stripped (in the presence of 20 grams of anhydrous sodium carbonate) to a kettle temperature of 180° C./3 mm. The filtered residue product had these properties: $n$ 30/D 1.43.81, sp. g. 20/20° 0.947, 379 equivalent weight by acetal analysis. The yield and efficiency were 45% and 67%, respectively, based on 1,1,5,5-tetraethoxypentane.

The polyethoxytetraethyl acetals described above ($x=7.1$ in the general formula) were hydrolyzed as described previously to produce an aqueous mixture of the dialdehydes. After neutralization of the acid catalyst, the mixture was hydrogenated in the presence of 5% Raney nickel catalyst at 1000 p.s.i.g. to a maximum temperature of 150° C. The filtered product was stripped to a kettle temperature of 85° C./12 mm. to obtain a mixture of polyethoxydiols having these properties: $n$ 30/D 1.4551, sp. g. 20/20° 1.002, 264 equivalent weight by hydroxyl analysis, 455 molecular weight by the Menzies-Wright method, insoluble in water. The yield of diols was 89% based on the acetals.

Example 12

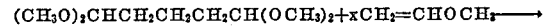
1,1,5,5-tetramethoxypentane     vinyl methyl ether

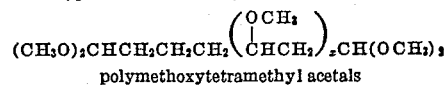
polymethoxytetramethyl acetals

A mixture of 1056 grams of 1,1,5,5-tetramethoxypentane (5.5 mols) and 2.0 grams of 43% boron trifluoride in diethyl ether was stirred at 30°–38° C. while 310 grams of gaseous vinyl methyl ether (5.35 mols) were fed over a period of 2.8 hours. After a reaction period of an hour at 30° C., the catalyst was neutralized by the addition of excess anhydrous ammonia. The product was stripped to a kettle temperature of 156° C./5 mm. to obtain a residue product having sp. g. 20/20° 1.005 and 161 equivalent weight by acetal analysis. This corresponds to an average value of $x=2.24$ in the above formula. The yield and efficiency were 52% and 81% respectively, based on 1,1,5,5-tetramethoxypentane.

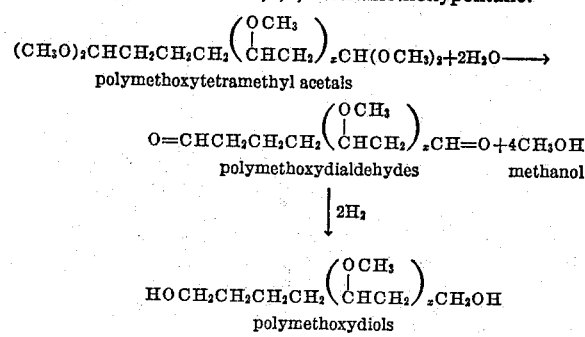

A mixture of 911 grams, of polymethoxytetramethyl acetals (5.65 equivalents, $x=2.24$), 911 ml. of water and 25 ml. of 0.5 N sulfuric acid (to reduce the pH to 2.5) was distilled over a period of 5.5 hours to exhaust all the methanol from the system. The residue was separated into 467 grams of oil layer containing 3.30 equivalents of dialdehydes and 836 grams of aqueous layer containing 2.07 equivalents of dialdehydes. The yield of polymethoxydialdehydes was 95% based on the acetals.

One half of each layer of dialdehyde solution described above were mixed and treated with 24 ml. of 0.5 N sodium hydroxide to increase the pH of the mixture to 5.5. The resulting mixture was hydrogenated in the presence of 34 grams of Raney nickel to a maximum temperature of 150° C. and 1000 p.s.i.g. The filtered product was distilled to obtain the diol fractions described in Table I. By comparison to the theoretical values for the first three members of this series of diols given in Table II, it may be seen that these were the principal products.

TABLE I

| Fraction | Boiling Range, °C./ 3 mm. | Eq. Wt.[1] | Mol. Wt.[2] | $x$ [3] | Percent C | Percent H | n 30/D | Sp. G. 20°/20 | Miscible with $H_2O$? | Percent of Still Charge |
|---|---|---|---|---|---|---|---|---|---|---|
| 1 | 126-152 | 116.0 | 158.5 | 0.95 | 58.4 | 11.4 | 1.4525 | 1.010 | Yes | 18 |
| 2 | 152-165 | 111.3 | 174.7 | 1.22 | 60.6 | 11.6 | 1.4620 | 1.020 | Yes | 28 |
| 3 | 165-212 | 114.4 | 203.5 | 1.71 | 60.3 | 10.8 | 1.4658 | 1.035 | Yes | 18 |
| 4 | 212-271 | 153.1 | 287.5 | 3.16 | 62.3 | 10.6 | 1.4761 | [4] 1.038 | Yes | 17 |
| Residue | | | | | | | | | No | 19 |

[1] Determined by hydroxyl analysis.
[2] Determined by the Menzies-Wright method.
[3] Calculated from the observed molecular weight.
[4] Taken at 40° C.

TABLE II

| $x$ | Eq. Wt. | Mol. Wt. | Percent C | Percent H |
|---|---|---|---|---|
| 1 | 81 | 162 | 59.3 | 11.1 |
| 2 | 110 | 220 | 60.0 | 10.9 |
| 3 | 139 | 278 | 60.4 | 10.8 |

The two other halves of the dialdehyde layers described above were mixed and treated with 26 ml. of 0.5 N sodium hydroxide to increase the pH to 5.5. This mixture was hydrogenated in the presence of 34 grams of Raney nickel to a maximum pressure of 150° C. and 1000 p.s.i.g. The filtered solution was stripped to a kettle temperature of 70° C./1 mm. to obtain a residue product having these properties: $n$ 30/D 1.4692, sp. g. 25°/20° 1.039, 115.5 equivalent weight by hydroxyl analysis, 204.1 molecular weight by the Menzies-Wright, miscible with water. The yield of diols was 82% based on the dialdehydes. The average value for $x$ in this residue product was 2.19 based on the hydroxyl analysis, while the value was 1.73 based on the observed molecular weight.

PREPARATION OF POLYESTERS

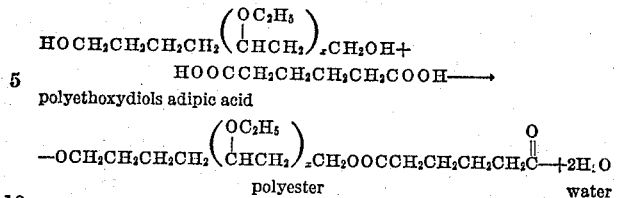

Example 13

Adipic acid was esterified with a 10% excess of three different mixtures of polyethoxydiols by refluxing at 175°–185° C. in the presence of xylene until no more water was being formed. The mixture was stripped to a kettle temperature of 175°/5 mm. to obtain the polyesters as residue products having the properties recorded below. The yields were almost quantitative in each experiment.

| Experiment Number | Eq. Wt. of Diol Mixture [1] | $x$ [2] | Polyester Properties | | |
|---|---|---|---|---|---|
| | | | n30/D | Mol. Wt. [4] | Acidity [3] |
| 1 | 115.4 | 1.76 | 1.4729 | 2,379 | 0.245 |
| 2 | 181.5 | 3.60 | 1.4650 | 1,152 | 0.589 |
| 3 | 264.0 | 5.90 | 1.4615 | 1,175 | 0.441 |

[1] Determined by analysis for hydroxyl groups.
[2] Calculated from the equivalent weight of the diol mixture.
[3] Ml. of 1.0 N KOH per gram.
[4] Determined by the Menzies-Wright method as modified by Hill and Brown [Analytical Chemistry 22, 562 (1950)].

A mixture of 1 part of polyester and 3 parts of dioctyl phthalate was compatible with a vinyl chloride-acetate copolymer containing 97% vinyl chloride at 41% plasticizer concentration. This plasticized composition had excellent permanence because of low volatility and low oil extraction.

PREPARATION OF DIESTERS

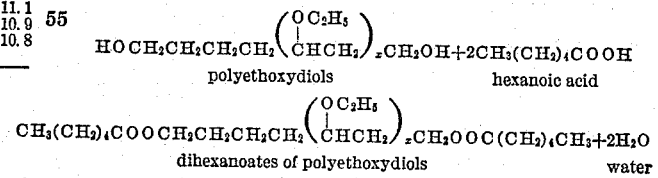

Example 14

A mixture of 139 grams of distilled polyethoxydiol (1.0 equivalent, fraction 3 of Example 9), 232 grams of hexanoic acid (2.0 equivalents), 300 ml. of toluene and 1 ml. of concentrated sulfuric acid (0.0375 equivalent) was refluxed an hour at atmospheric pressure while the water liberated was collected in a decanter. The residue was treated with 3.5 grams of anhydrous sodium acetate (0.4 equivalent) and stripped to a kettle temperature of 145° C./1 mm. The residue was washed with 250 ml. of water at 60° C. (to remove salts) and 90 ml. of heptane were added to aid the separation of layers. The oil layer was stripped to a kettle temperature of 140° C./2 mm. to obtain the esters as a residue product having sp. g. 20/20°

0.956, n 30/D 1.4439, 1.8% acid as hexanoic, 219 equivalent weight as ester, 413 molecular weight by the Menzies-Wright method. The yield was almost quantitative.

This ester mixture was compatible at 40% concentration in vinyl chloride-vinyl acetate copolymers.

*Example 15.—Polyurethane elastomers*

Adipic acid (146 grams), polyethoxydiols (molecular weight 336, equivalent weight 181.5, $x=3.22$ based on molecular weight) (320 grams), and ethylene glycol (12.4 grams) were heated at 160° C. for 26 hours. The reaction temperature was then increased to 190° C., and a vacuum of 10 mm. was applied for 3.5 hours. The resulting polyester had a hydroxyl number of 46.7, a carboxyl number of 8.4, and a molecular weight of about 1770.

This polyester (250 grams) was then reacted with 3,3'-dimethyl-4,4'-biphenylene diisocyanate (56 grams) at 120–140° C. for 15 minutes. Ethanolamine (5.2 grams) was then added and the mixture was stirred until an elastomeric gum-stock was obtained.

To a portion of the above gum-stock, 7 percent by weight of 3,3'-dimethyl-4,4'-biphenylene diisocyanate was added on a cold rubber mill. The resulting mixture was molded into a test specimen of 0.07 inch thickness by molding under pressure for 15 minutes at 160° C. The cured elastomer exhibited the following physical properties:

| | |
|---|---|
| Tensile strength _____p.s.i__ | 1125 |
| Elongation at break _____percent__ | 150 |
| Load at 100% elongation _____p.s.i__ | 800 |
| ASTM stiffness _____ | 812 |
| Durometer "A" Hardness _____ | 64 |
| Brittle temperature _____° C__ | −30 |
| Tf _____° C__ | −25 |
| T4 _____° C__ | −9 |

*Example 16.—Modified phenolic resins*

The following charge was placed in a three-necked flask fitted with condenser, air stirrer and thermometer.

10 grams Polyethoxydiols: $HOCH_2CH_2CH_2CH_2(\overset{OC_2H_5}{\underset{|}{CH}}-CH_2)_xCH_2OH$ (equivalent weight, 189.6; molecular weight, 295.0; $x=2.65$)

24 grams phenol 9.5 grams zinc chloride

The material was stirred vigorously and heated at 160° C. for 6 hours after which time the flask was cooled and the material was washed with warm water several times. A solution was made in methanol and activated charcoal was used to remove some of the color. After filtering the methanol solution was steam distilled and the residue was dried at 50° C. for 24 hours in a forced air oven. Seven grams of a dark brown solid which showed 45.6% phenol by analysis was recovered.

Five grams of the above solid was dissolved in 20 grams of ethyl alcohol/toluene (50/50) and 3.6 grams of formalin and 0.1 gram of potassium hydroxide were added to the solution. This mixture was stirred for 7½ hours at room temperature after which time a film was dip coated from the solution onto a 1" x 4" iron panel. The panel was baked for 1 hour at 200° C. and the resulting coating on testing showed good flexibility, strength, solvent resistance (5 min. boiling pyridine) and water-resistance (1 hour boiling water).

What is claimed is:

1. Mixtures of the group consisting of alkoxy-substituted alpha, omega primary diols of the formula

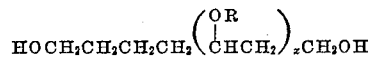

where R is an alkyl radical having from 1 to 8 carbon atoms and $x$ has an average value from 1.5 to 10.

2. A mixture of alkoxy-substituted alpha, omega primary diols of the formula

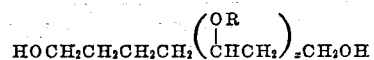

where R is an alkyl radical having from 1 to 8 carbon atoms and $x$ has an average value from 1.5 to 5.5.

3. The compositions of claim 2 where R is methyl.

4. The compositions of claim 2 where R is ethyl.

5. A mixture of water-insoluble ethoxy-substituted alpha, omega primary diols of the formula

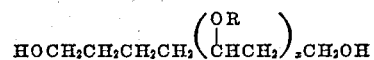

where R is ethyl and $x$ has an average value from 2 to 10.

6. A mixture of water-insoluble methoxy-substituted alpha, omega primary diols of the formula

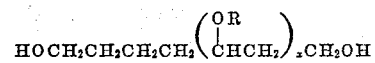

where R is methyl and $x$ has an average value from 4 to 10.

References Cited in the file of this patent

UNITED STATES PATENTS

| | | |
|---|---|---|
| 2,487,525 | Copenhaver | Nov. 8, 1949 |
| 2,502,433 | Copenhaver | Apr. 4, 1950 |
| 2,514,168 | Smith et al. | July 4, 1950 |
| 2,556,312 | Young | June 12, 1951 |
| 2,575,195 | Smith et al. | Nov. 13, 1951 |
| 2,587,904 | Ryan | Mar. 4, 1952 |
| 2,600,275 | Smith | June 10, 1952 |
| 2,618,663 | Glickman | Nov. 18, 1952 |
| 2,622,101 | Paul et al. | Dec. 16, 1952 |
| 2,623,906 | Gresham | Dec. 30, 1952 |
| 2,654,775 | Bell et al. | Oct. 6, 1953 |
| 2,691,663 | Smith | Oct. 12, 1954 |
| 2,691,684 | Frevel et al. | Oct. 12, 1954 |
| 2,704,771 | Smith | Mar. 22, 1955 |
| 2,768,976 | Weidlich et al. | Oct. 30, 1956 |

FOREIGN PATENTS

| | | |
|---|---|---|
| 698,736 | Great Britain | Oct. 21, 1953 |

OTHER REFERENCES

Curme et al.: Glycols (1952), pp. 284–299.